Sept. 20, 1960     G. O. HUFSTADER     2,953,001

UNIVERSAL JOINT EXPANSION BALL

Filed March 20, 1959

INVENTOR.

Gibson O. Hufstader

BY L.D. Burch

ATTORNEY

United States Patent Office 2,953,001
Patented Sept. 20, 1960

2,953,001

UNIVERSAL JOINT EXPANSION BALL

Gibson O. Hufstader, Warren, Mich., assignor to General Motors Corporation, Detroit, Mich., a corporation of Michigan Filed Mar. 20, 1959, Ser. No. 800,687

6 Claims. (Cl. 64—17)

This invention relates to universal joints and more particularly to the type of a universal joint in which two standard Cardan joint sections are used, with a connecting member joining them together, and a centering device between the two adjacent Cardan sections positions the sections for proper operation.

The function of a double Cardan universal joint depends on the internal balancing of the force coupled generated in one Cardan section with the opposite couple generated in the other Cardan section. It has been well known in the past to accomplish the force balancing by means of a ball and socket joint located between the two Cardan sections. A centering ball generally supports a small pilot shaft extension of one of the Cardan members and is received in a socket member supported by the opposite joint section.

In the operation of the known double universal joint, a downward force produced at one Cardan section is transmitted to the ball joint through the pilot shaft. This downward force is balanced by an equal and opposite force developed in the other Cardan section and acting on the ball socket. The existence of radial clearance, of an appreciable amount above a very minimum value, allows the force change in the ball socket to move the shaft from side to side within the ball, and thus allowing the ball to move from side to side within the ball socket. This side to side motion in the ball socket, twice for each revolution of the joint, produces a metallic sound which, when multiplied times the shaft speed, builds up a continuous tone distinguishable from other car sounds and one that is definitely objectionable.

It is here proposed to provide a double Cardan universal joint, having the pilot shaft, ball and socket positioning means, and to keep the total radial clearance between the pilot shaft portion, ball, and socket portion to minimum, to reduce the impact as the load is changed and thus reduce the sound produced at each revolution. This is accomplished by means of a centering ball that will maintain zero to minimum radial clearance and still not be sufficiently tight to produce binding or heating from friction. This freedom from binding or heating is required to insure adequate durability of the centering ball for the life of the driveline. The proposal is accomplished by means of a centering ball having separable sections, the sections being spaced by some resilient member such that the ball assembly may expand or contract depending on the clearance allowed or the take-up desired.

Through the use of the proposed centering ball, it is found that the objectionable vibration noise is reduced to a minimum and the operation of the double Cardan universal joint is made more efficient.

Figure 1:
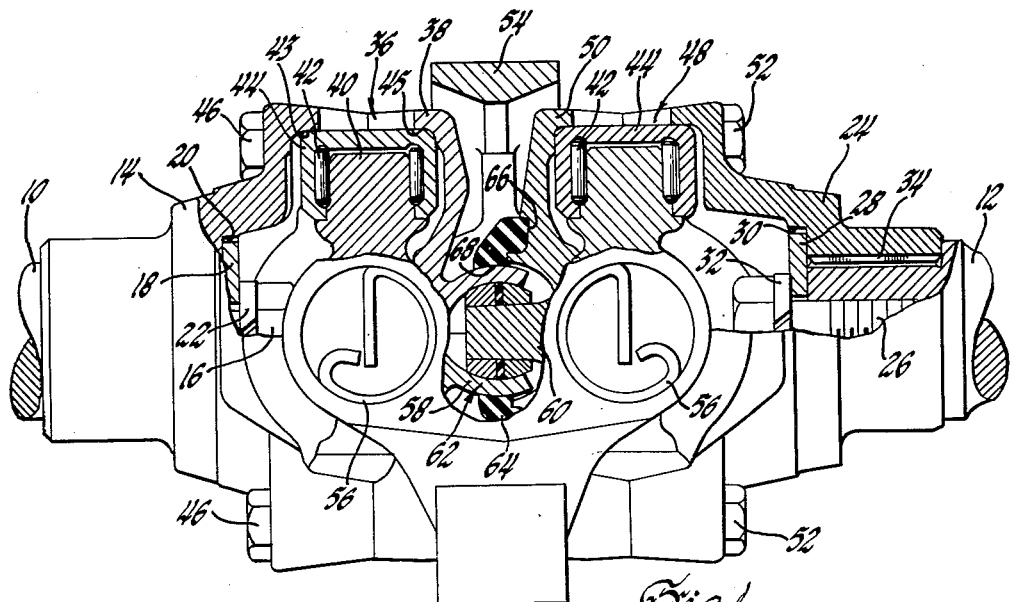
Figure 1 is a view with parts broken away and in section of the universal joint assembly embodying the invention.

Referring more particularly to the drawings, Figure 1 illustrates the double Cardan type universal joint connecting two portions of a propeller shaft, such as propeller shaft portion 10 and propeller shaft portion 12. A Cardan yoke 14 is secured to the shaft portion 10, as by a bolt 16 and a washer 18, the washer being received in an annular groove 20 formed in the yoke 14. A lock washer 22 insures a sufficiently tight connection. Similarly, the Cardan yoke section 24 is secured to the shaft portion 12 by a bolt 26 and washer 28 the washer being received in the groove 30 formed in the yoke section. A lock washer 32 insures a secure connection. The yoke sections 14 and 24 may be splined to the shaft sections 10 and 12, as indicated at 34. This would be accomplished by an internal spline formed in the yoke sections 14 and 24 and a mating external spline formed on the surface of the shaft portions 10 and 12.

A spider and bearing assembly, indicated generally by the numeral 36, is received between the yoke portion 14 and the mating member 38. The spider and bearing assembly comprises four shaft sections 40, extending at right angles to each other, and each having an annulus of needle bearings 42 and a bearing cap 44 secured on the end thereof. The yoke member 14 and mating member 38 are clamped together by means of a plurality of bolts 46 which secure the bearing caps 44. The bearing caps are located, with respect to the axis of the drive line, by shoulders 43 and 45, formed from the yoke 14 and the mating member 38.

A similar spider and bearing assembly 48 is provided between the yoke section 24 and the mating member 50 and is retained therebetween by bolts 52.

Connecting the two Cardan yoke sections 14 and 24, through the spider and bearing assemblies 36 and 48, is an H-shaped intermediate member 54 which receives two of the four shaft portions of each of the spider and bearing assemblies and retains the bearing caps therein by means of retaining rings 56. Torque is thus transmitted from the drive shaft portion 10, through the yoke 14, and the spider and bearing assembly 36, to the intermediate member 54, and to the opposite Cardan joint assembly and the output shaft 12.

The centering or positioning assembly between the two Cardan sections comprises the socket portion 58, formed from the mating member 38, and the pilot shaft portion 60, formed from the mating member 50. The pilot shaft portion 60 is disposed within the socket portion 58 such that the center of the shaft portion will be substantially at the center of the generally spherical socket. A ball centering device, indicated generally by the numeral 62, is received on the shaft portion 60 and within the socket portion 58. The centering ball serves to maintain the distance between the socket portion and the shaft member 60, and it may be seen that the centering ball will maintain the proper axial location between the Cardan joint sections with relative angularity between the two.

In order to prevent dirt, foreign material or water from interfering with the fit between the shaft portion 60, the centering ball 62 and the socket portion 58, a rubber seal 64 is provided. The seal is retained in the mating member 50 by means of groove 66 formed therein, and a tight fit, as at 68, about the socket portion 58. The seal 64 is free to flex or stretch with the angular motion of the universal joint sections without losing contact with the socket portion, to maintain an adequate seal at all conditions of operation.

Figure 2:
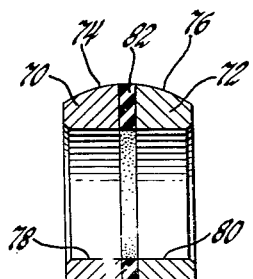
Figures 2 through 6 are cross sectional views of five modifications of the centering ball.

Figures 2 through 6 show several modifications of the centering ball which may be used between the pilot shaft portion 60 and the socket portion 58. In Figure 2, a modification is shown in which two annular rings 70 and 72, having the outer surfaces 74 and 76 thereof formed to the shape of a portion of a sphere, and the inner surfaces 78 and 80 being cylindrically formed. The annular members 70 and 72 may be formed from hardened and ground steel, sintered iron, cast iron, sintered or oilite bronze, aluminum, or the like, and may be coated with materials such as Teflon, nylon, or the like, where necessary.

Separating the two members 70 and 72 is an annular resilient washer member 82 formed from neoprene or the like, and the outer and inner surfaces thereof continuing the contour of the annular members 70 and 72. The resilient washer member serves to bias the annular members in outward directions, thus taking up any clearance that might exist between the pilot shaft portion 60 and the socket portion 58.

Figure 3:
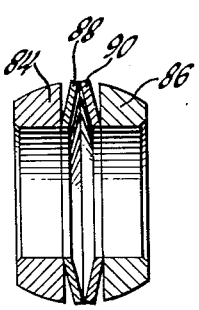

Figure 3 shows a second modification of the centering ball in which annular members 84 and 86 are formed in a similar manner to that of the modification of Figure 2. A pair of Belleville washers 88 and 90 are disposed between the members 84 and 86. The Belleville washers are arranged such that the biasing force provided by the face to face contact will be in an outward direction, in order to take up clearance between the shaft portion 60 and the socket portion 58. It may be noted that a single Belleville washer may be sufficient, depending on the size and type of universal joint assembly employed, and it is not desired to restrict the invention to a single or a double Belleville washer application.

Figure 4:
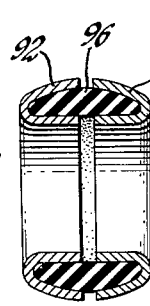

A third modification is shown in Figure 4, in which the shaped annular members 92 and 94 are formed from pressed steel, or the like, and are formed in the shape of channels opening toward each other. An annular resilient member 96 is disposed within the open channels with the biasing force in an outward direction, in order to take up the above mentioned clearance.

Figure 5:
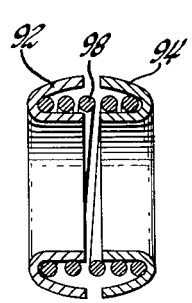

The modification shown in Figure 5 is similar to that of Figure 4, with the channel members 92 and 94 separated and outwardly biased by means of a coil spring 98 disposed within the channels.

Figure 6:
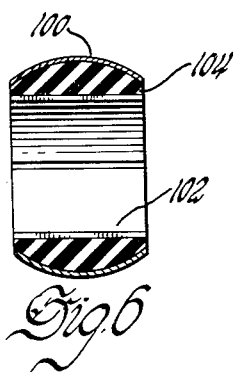
Figure 7:
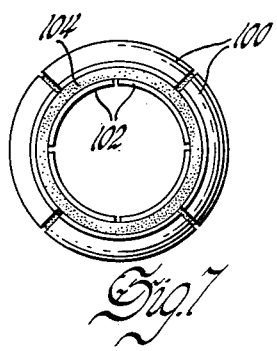
Figure 7 is a side view of the modification shown in Figure 6, illustrating the location of the various parts.

The modification illustrated in Figures 6 and 7 is a centering ball in which the outer surface is formed from a plurality of sections 100, the sections being arcuate in a plane normal to an axis of the centering ball, and arcuate in cross section as shown in Figure 6. Thus, the outer surface of the members will take the shape of a portion of a sphere. A plurality of arcuate inner sections 102 are cylindrical in cross section, in order to be received on the shaft portion 60. A resilient annular member 104 is disposed between the inner and outer sections 102 and 100 and biases the outer sections 100 in radial directions, thus separating the members and increasing the size of the centering ball to take up the clearance between the shaft portion 60 and socket portion 58.

The resilient member utilized with each of the modifications may be of such dimensions as to expand the centering ball to a size slightly larger than the socket portion. In this manner, the pre-load provided will further insure a tight fit between the members to prevent any clearance knock or vibrations from setting up objectionable noises.

Thus it may be seen that a plurality of expansible centering balls are provided which will eliminate the side to side movement of the centering shaft portion 60 with respect to the centering ball and the socket portion 58 to produce the objectionable noise.

What is claimed is:

1. In a double universal joint of the type having a pair of universal joint assemblies with positioning means therebetween and secured thereto, said centering means including a socket and a stub shaft extending thereinto, a centering ball receivable on said stub shaft and in said socket and comprising a plurality of members each having an outer surface forming a portion of a spherical surface, and resilient means disposed between said members and outwardly biasing said members to minimize clearance in said positioning means and prevent objectionable vibration and noise in said universal joint.

2. In a double universal joint of the type having a pair of universal joint assemblies with positioning means therebetween and secured thereto and including a stub shaft and a socket, a centering ball received on said stub shaft and in said socket and comprising a plurality of members each having an outer surface forming a portion of a spherical surface, and resilient means engaging each of said members and biasing said members in an outward direction, said members being spread by said resilient means to a size approaching the size of said socket to provide a pre-load on said positioning means and to prevent vibration and objectionable noise in said universal joint under normal operation.

3. In a double universal joint of the type having a pair of universal joint assemblies connected by an intermediate member, positioning means comprising a socket member secured to one of said assemblies and inwardly and axially extending therefrom, a shaft member extending from the other of said assemblies and extending into said socket member, a pair of spherical segments received about said shaft member and within said socket member, and resilient means between said segments and biasing said segments into engagement with said socket to minimize clearance between said socket member and said shaft member and prevent objectionable vibration and noise in said universal joint during normal operation thereof.

4. In a universal joint of the type having a pair of universal joint assemblies connected by an intermediate member and having joint positioning means therebetween and secured thereto, said joint positioning means including a socket portion extending from one of said assemblies and a shaft portion extending from the other of said assemblies and into said socket portion, a centering ball receivable in said positioning means and comprising a pair of annular members having the outer surfaces thereof spherically formed and cooperating substantially with said socket, and annular resilient means separating said members and biasing in opposite axial directions, said centering ball being receivable over said shaft portion of said positioning means and within said socket member to minimize clearance between said shaft portion and said socket member and eliminate objectionable vibration and noise during operation of said universal joint.

5. The centering ball set forth in claim 4 wherein said annular members are separated by a pair of Belleville washer members in opposing relation with respect to each other to bias said annular members in opposite axial directions.

6. The centering ball set forth in claim 4 wherein said annular members are channel-shaped sheet metal members with the channel openings adjacently disposed, and said resilient means is formed of an annular rubber-like member received in said channel-shaped members to bias said members outwardly and minimize clearance between said socket portion and said shaft portion.

References Cited in the file of this patent

UNITED STATES PATENTS

| | | |
|---|---|---|
| 1,025,884 | Schmitt | May 7, 1912 |
| 2,067,286 | Pearce | Jan. 12, 1937 |
| 2,106,672 | Wollner | Jan. 25, 1938 |
| 2,255,762 | Dodge | Sept. 16, 1941 |

FOREIGN PATENTS

| | | |
|---|---|---|
| 769,158 | Great Britain | Feb. 27, 1957 |
| 797,545 | Great Britain | July 2, 1958 |